March 10, 1931. R. O. BOYKIN 1,795,634
VACUUM SEAL FOR CONTINUOUS ROTARY VACUUM FILTERS
Original Filed Nov. 23, 1927
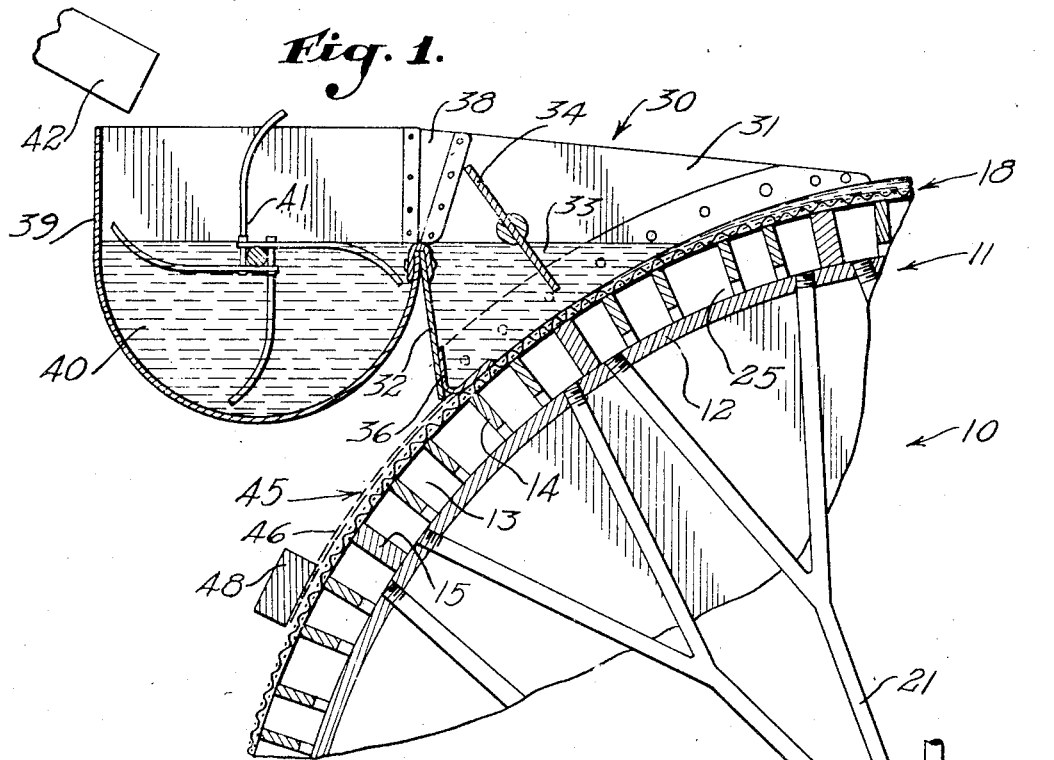
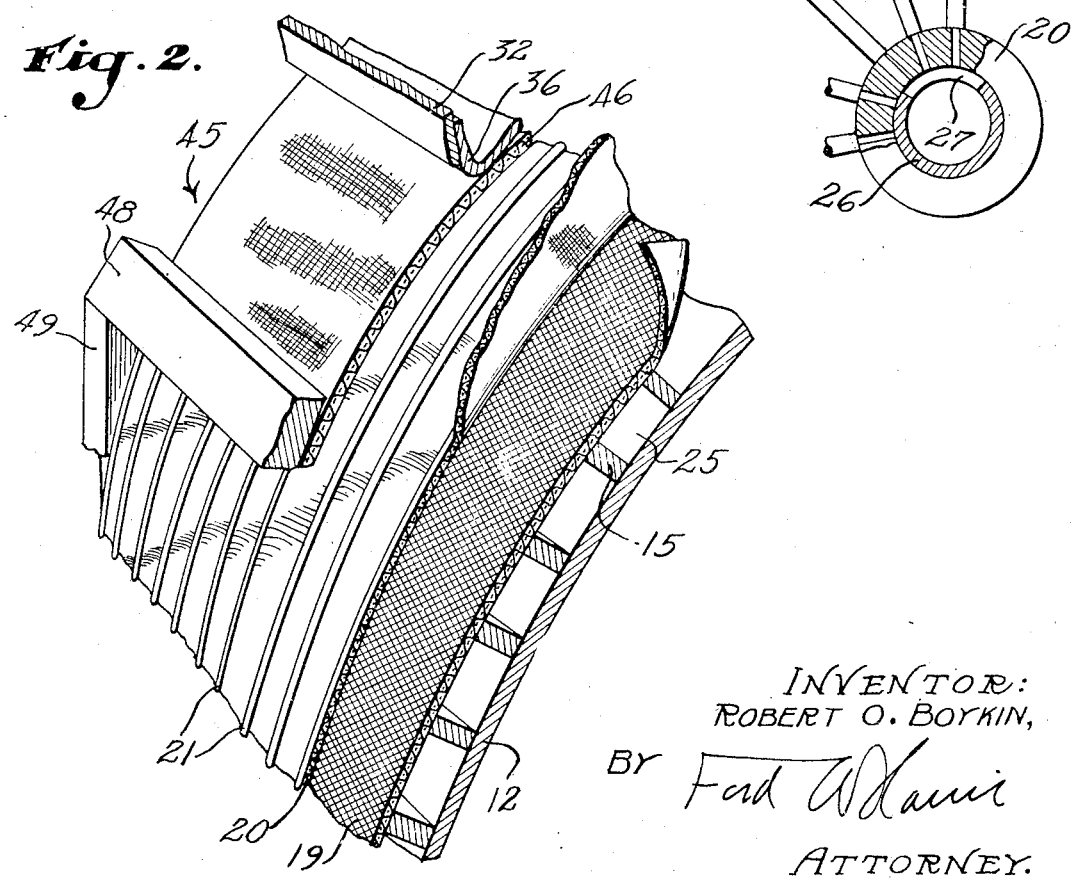
INVENTOR:
ROBERT O. BOYKIN,
BY Ford A Harris
ATTORNEY.

Patented Mar. 10, 1931

1,795,634

UNITED STATES PATENT OFFICE

ROBERT O. BOYKIN, OF LOS ANGELES, CALIFORNIA, ASSIGNOR TO ALEX MILLS, OF LOS ANGELES, CALIFORNIA

VACUUM SEAL FOR CONTINUOUS ROTARY VACUUM FILTERS

Application filed November 23, 1927, Serial No. 235,260. Renewed August 11, 1930.

My invention relates to vacuum filters and more particularly to rotary vacuum filters.

Rotary vacuum filters in common use include a drum having a filter screen or cloth provided on the periphery thereof and having an annular vacuum space formed just under the filter cloth. The drum is rotated on a hollow shaft connected with a vacuum pump and which is connected, through pipes in the drum, to said vacuum space so as to set up a vacuum in this. A mixture of liquid and solids to be filtered is held in contact with the filter cloth while the drum is rotated. The cake of solids forming on the filter cloth is removed by suitable scrapers, while the liquids pass through the filter cloth and are discharged by the vacuum pump.

I have found that an excessive amount of air has to be handled by the vacuum pump, owing to the porous character of the filter cloth, and the fact that during a considerable portion of each revolution it is not covered by any cake.

It is correspondingly an object of my invention to provide a rotary vacuum filter in which the atmosphere is substantially excluded from access to a portion of the filter cloth when a vacuum is formed therebeneath.

Further objects and advantages will be made manifest in the following description and accompanying drawings in which a preferred embodiment of my invention is diagrammatically illustrated. In the drawings:

Fig. 1 is a vertical sectional view through a rotary vacuum filter embodying my invention.

Fig. 2 is a fragmentary perspective view illustrating the construction of the vacuum seal of my invention.

Referring specifically to the drawings:

Fig. 1 diagrammatically shows a rotary filter 10, which includes a filter drum 11 having a cylindrical felly 12 on the ends of which are provided radial walls 13 between which are disposed perforated filter screen supports 14 and solid vacuum compartment partitions 15. Resting upon and secured to the outer edges of the walls 13, the supports 14, and the compartment partitions 15, is a filter screen 18.

As clearly shown in Fig. 2, the filter screen 18 includes a layer of wire screen 19, a layer of fairly closely woven cloth 20, and a single spiral winding of wire 21, adjacent turns of which are substantially one-half inch apart so that said winding is of screw-thread form. As shown in Fig. 1, the compartment partitions 15 are equally spaced about the felly 12 so as to provide a series of vacuum compartments 25 of equal size.

The felly 12 is adapted to be connected to and supported upon a hub 20ª by spoke pipes 21ª, which connect the vacuum compartments 25 to an interior bore of the hub 20ª. The hub 20ª is mounted upon a stationary hollow axle 26 which has a port 27 formed therein which connects successively with the vacuum compartments 25, as these move into a certain position relative to the axle 26.

Any suitable means may be provided on the drum 11 for rotating this.

Means for holding a body of mixture to be filtered against the screen 18 is embodied in a mixture distributor 30 which is supported in proximity to the drum 11 and over the filter screen 18, when this is disposed upwardly. The distributor 30 includes side walls 31 and a back wall 32, which cooperate with the screen 18 to form a basin for holding a body of mixture 33. Rotatably mounted in the distributor 30 is a paddle 34 for keeping the mixture 33 agitated. Formed upon the lower edges of the walls 31 and 32 is a flexible flap 36 which rests down against the filter screen 18 and prevents the escape of the mixture 33 from the distributor 30.

Flexibly connected to the wall 32, as by a leather hinge 38, is a reservoir 39 containing a body of mixture 40 which is adapted to be kept agitated by a paddle 41 rotatably mounted in the reservoir 39. The mixture is fed to the reservoir 39 in any suitable manner as by a chute 42. The flexible connection 38, between the distributor 30 and the reservoir 39, is for the purpose of permitting slight freedom of movement to the distributor 30 so that it may adjust itself to the filter screen 18 during the rotation of the drum 11.

The construction already described has been previously used and when so used has operated as follows: A suitable vacuum pump having been connected to the hollow shaft 26 and set in operation, the drum 11 is rotated and a supply of mixture is fed from the chute 42 to the reservoir 39 and thence to the distributor 30. As the drum 11 rotates, the various pipes 21ᵃ come into communication with the slot 27 so that air from the compartments 25, with which these pipes connect, is evacuated as the filter screen covering each of these compartments comes under the flap 36 of the distributor 30. It is essential that the vacuum in each of these compartments be established at this time in order that the flap 36 be held downward against the screen 18 and in order, as the drum 11 turns, that the liquid in the mixture 33 be drawn through the screen 18 and the meal or other solid substance in the mixture be accumulated as a cake on the outer surface of the screen 18. When the leading edge of that portion of the screen 18 which is disposed over any of the compartments 25 would come opposite the flap 36 and the lower portion of the mixture 33, a large part of the screen covering that compartment 25 was exposed to the atmosphere and, being highly porous, this exposed portion of the screen admitted a large amount of air which added considerably to the burden placed on the vacuum pump and reduced the efficiency of the entire apparatus.

In order to overcome this difficulty, I have provided a vacuum seal 45 which includes a flexible sealing member 46 which may be formed of a fabric such as heavy canvas. This is preferably rendered impervious as by a treatment with casein. The flexible member 46 may be attached to the flap 36 at its upper end and extends downward so as to lie close to the filter screen 18, and is attached along its lower edge to a stationary cross-bar 48 which is rigidly supported as by suitable frame means 49. The flexible member 46 of the vacuum seal 45 is of such size as to cover all of the formerly exposed portion of each compartment 25, when the upper portion of this compartment comes opposite the lower end of the distributor 30, at which time it is necessary that the evacuation of air from this compartment 25 commence. The impervious flexible member 46 is supported on the wire windings 21 of the filter screen 18 so as not to rub against the filter cloth 20, yet it substantially seals off the filter screen 18 from the atmosphere so that no air may be admitted therefrom directly through this screen into any of the compartments 25. This substantial seal being in a measure due to the uninterrupted screw-thread form of the wire winding 21 which always tracks in a uniform path along the sealing member 46, that is, since the winding is of screw-thread form the vacuum influence will cause the wire 21 to become partially embedded into the under surface of the sealing member 46 forming therein a portion of a female screw-thread into which the spiral wire 21 may track without interruption of the seal.

I have found that by the use of the vacuum seal 45, the vacuum pumping capacity required for the successful operation of a vacuum filter 10 is substantially cut in half with much better results, especially where a volatile solvent, such as benzol, is one of the liquid ingredients of the mixture 33 which it is desired to filter out of the mixture. In the common method of using a rotary filter to filter a mixture which includes benzol, the amount of air drawn into the filter from the atmosphere, owing to premature exposure of the screen, dilutes the benzol vapors to such an extent as to require a much greater condenser capacity than is necessary in the operation of a continuous filter with the vacuum seal 45.

I claim as my invention:

1. In a rotary vacuum filter the combination of: a rotary frame member; a filter medium provided upon said member and rotating therewith; means for contacting said filter medium with a body of the mixture to be filtered at a certain position in the rotation of said medium, said body of mixture being supported upon said filter medium; means for forming a vacuum under successive portions of said filter medium as each portion enters said contact; and means for sealing off each of said portions from the atmosphere as it is entering said contact with said mixture.

2. In a rotary vacuum filter the combination of: a rotary frame member; a filter medium provided upon said member and rotating therewith; means for contacting said filter medium with a body of the mixture to be filtered at a certain position in the rotation of said medium, said body of mixture being supported upon said filter medium; means for forming a vacuum under a portion of said filter medium; and means for substantially sealing off from the atmosphere that part of said portion of said filter medium which is under the influence of said vacuum and which is not in contact with said mixture.

3. In a rotary vacuum filter the combination of: a rotary frame member; a filter medium provided upon said member and rotating therewith; means for contacting said filter medium with a body of the mixture to be filtered at a certain position in the rotation of said medium, said body of mixture being supported upon said filter medium; means for forming a vacuum under successive portions of said filter medium as each portion enters said contact; and a sheet of substantially impervious flexible material, lying against said filter medium for sealing off each of said portions from the atmosphere as it is entering said contact with said mixture.

4. A combination as in claim 3, in which a single wire is wound upon said filter medium in uniform spiral arrangement to support said sheet of flexible material.

5. In a rotary vacuum filter the combination of: a rotary frame; a filter medium provided upon said frame and rotating therewith; means for contacting said filter medium with a body of the mixture to be filtered at a certain position in the rotation of said medium, said body of mixture being supported upon said filter medium; means for forming a vacuum under a portion of said filter medium; a single wire winding disposed in uniform spiral arrangement over said filter medium; and a flexible, relatively impervious member slidably contacting said wires and substantially sealing off from the atmosphere that part of said filter portion which is under the influence of said vacuum and which is not in contact with said mixture.

In testimony whereof, I have hereunto set my hand at Los Angeles, California, this 19th day of November, 1927.

ROBERT O. BOYKIN.